3,520,872
PROCESS FOR LABELLING PURINE AND
PYRIMIDINE CONTAINING COMPOUNDS
William J. Wechter, Kalamazoo, Mich., assignor to The
Upjohn Company, Kalamazoo, Mich., a corporation of
Delaware
No Drawing. Filed Mar. 24, 1967, Ser. No. 625,577
Int. Cl. C07c 51/50
U.S. Cl. 260—211.5                8 Claims

ABSTRACT OF THE DISCLOSURE

An improved process for labelling specific positions in purine and pyrimidine moieties, e.g., of purine and pyrimidine bases, nucleosides, nucleotides, oligonucleotides, nucleic acids and coenzymes, with deuterium or tritium, which comprises (1) heating these starting compunds in deuterium oxide or tritium oxide solution, without a metallic catalyst, at a selected pH and (2) eliminating easily exchangeable deuterium and tritium atoms by treating with water or a proton-donating solvent while leaving firmly bound deuterium and tritium substituents. The new, specifically labelled products are commercial products used in biological studies of the metabolic fate of the labelled compounds.

BACKGROUND OF THE INVENTION

Field of the invention

This invention relates to a process for the production of deuterium and tritium labelled organic products and is particularly concerned with an improved process for labelling compounds containing purine or pyrimidine moieties, e.g., purine and pyrimidine bases, nucleosides, nucleotides, oligonucleotides, nucleic acids and coenzymes.

SUMMARY OF THE INVENTION

The novel process of this invention differs from processes in the art inasmuch as it is performed without metallic catalysts and furnishes labelled products in good yield. The labelling in this process is completely controlled as to the position of the deuterium or tritium in the purine or pyrimidine moieties. Thus, at pH values of 1 to 12 in the first step, purine moieties are labelled at position C–8. At pH values of 1 to 8, pyrimidine moieties are labelled at position C–5; at pH values above 8, labelling occurs at both C–5 and C–6. In natural pyrimidine bases, nucleosides, nucleotides, nucleic acids and coenzymes, the pyrimidine moiety occurs as a 2-pyrimidinone moiety. However, compounds containing 2-pyrimidinethione moieties can also be labelled, at the positions designated above, by the process of this invention. Schematically the process of this invention can be illustrated by the following formulae, showing deuterium labelling:

Pyrimidine moieties:

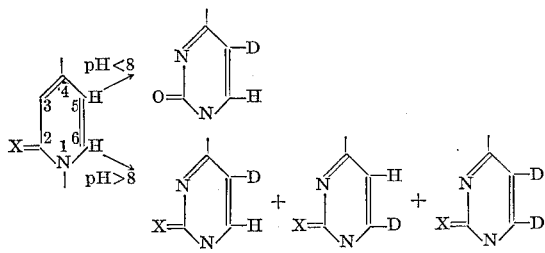

wherein X is selected from the group consisting of O and S.

Purine moiety:

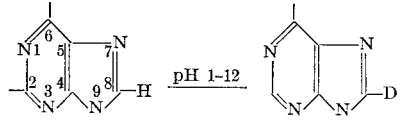

The process of the present invention thus comprises (1) heating a purine- or pyrimidine-containing compound with deuterium oxide ($D_2O$) or tritium oxide ($T_2O$) at a selected pH to give the corresponding deuterium or tritium substituted product; and (2) treating with water and/or proton-donating solvent until the easily exchangeable deuterium or tritium atoms are replaced by hydrogen atoms, thus providing products substituted only in the positions indicated in the above-shown scheme, and isolating the desired products by methods known in the art.

In the first step of the present invention all types of exchangeable hydrogen atoms, whether easily or difficultly replaceable, of the purine and pyrimidine moieties of the starting compounds are replaced in part by deuterium or tritium atoms. As examples, in the case of adenine- or guanine-containing compounds, the easily exchangeable hydrogens of the amino group of the purine moiety are replaced in addition to the difficultly replaceable hydrogen at carbon 8; in the case of cytosine-containing compounds, the easily replaceable hydrogens of the amino group, and in the case of thymine- or uracil-containing compounds the easily replaceable hydrogen at nitrogen 3 are replaced in addition to the difficultly replaceable hydrogens at carbon 5 and/or carbon 6. In the second step of the invention the resulting easily replaceable deuterium and tritium atoms are again replaced by hydrogen. This step is accomplished by treatment at room temperature with water, water-methanol, water-ethanol, water-acetic acid or other proton-donating solvents, yielding thereby the desired labelled molecules with purine moieties labelled at positions C–8 and pyrimidine moieties labelled at positions C–5, C–6 or C–5 and C–6, as products. If the second step were not done, then during metabolic studies the easily replaceable deuterium or tritium atoms of the purine- or pyrimidine-containing products would be exchanged rapidly in the body of the experimental animal by exchangeable hydrogen atoms, for example, by hydrogen atoms from body fluids, thus obscuring the fate of the labelled product compound.

DESCRIPTION OF THE PREFERRED EMBODIMENT OF THE INVENTION

The labelled compounds of this invention, for example, labelled purine and pyrimidine bases, nucleosides, nucleotides, oligonucleotides, nucleic acids and coenzymes, are useful in biological studies in animals, for example, studies on adsorption and cellular incorporation, distribution, metabolism and excretion, studies of viruses and virus diseases, and advanced studies in genetics and molecular biology. Some of the products of this invention are already used commercially, but other more complicated specifically labelled compounds have not been available from existing technology. For example, tritium labelling of bis-(1-β-D-arabinofuranosyl)cytosine - 5′ - phosphate was attempted by catalytic exchange methods with metal catalysts but was unsuccessful because the unlabelled reactants themselves were destroyed under the standard reaction conditions used. The present invention allows the synthesis of such labelled products in high yields. In addition, transfer RNA's with purine moieties labelled specifically at positions C-8 and pyrimidine moieties labelled specifically at positions C-5, C-6, or at positions C-5 and C-6 are not readily available from current technology but can be made easily and in high yield by the process of the present invention.

In carrying out the process of the present invention for deuterium labelled compounds, the starting material, which may be a purine or pyrimidine base, nucleoside, nucleotide, oligonucleotide, nucleic acid, or coenzyme, is dissolved in deuterium oxide or deuterium oxide-water to give a starting material concentration in the reaction mixture of about 0.2 to 2 miles in the case of purine and pyrimidine bases, nucleosides, nucleotides, oligonucleotides and coenzymes and of about 0.1 to 5 grams per liter in the case of nucleic acids. The deuterium oxide or deuterium oxide-water can contain from 10 to 100 percent deuterium oxide, although generally 75 to 100 percent deuterium oxide is preferred. To obtain products in which purine moieties are labelled with deuterium at position C-8 and pyrimidine moieties are labelled at position C-5, the pH during this reaction is maintained at pH 1 to 8. To obtain products in which purine moieties are labelled at position C-8 and pyrimidine moieties are labelled at positions C-5 and/or C-6, the pH during this reaction is maintained at pH 8 to 12. In the case of ribonucleic acids, the starting nucleic acids tend to be hydrolyzed at alkaline pH values and conditions approaching neutrality must be used. During the first reaction the pH can be maintained in the proper range by periodic adjustment if needed. Preferably, the pH is controlled by the addition of buffers compatible with the reactants and products, such as sodium or potassium hydrogen phosphates, acetates, citrates, tris(hydroxymethyl)aminomethane and others known in the art. The reaction mixture is now heated, for example, to from 75 to 100° centigrade, and held. In the case of small molecules such as purine and pyrimidine bases, nucleosides, nucleotides and oligonucleotides, the course of reaction can be followed by nuclear magnetic resonance (NMR) analysis. The NMR spectrum of the reaction mixture is determined at the start of the reaction and periodically thereafter. The rate of disappearance of hydrogen atoms at positions C-5 and C-6 ($H_5$ and $H_6$ protons) of the pyrimidine moieties and of the hydrogen atoms at position C-8 ($H_8$ protons) of the purine moieties, as a consequence of their replacement by deuterium atoms, or alternatively, the appearance of deuterons at these positions, can be followed. As a convenience, line heights or integration curves can be related to those for non-reactive protons, for example, to the proton at position C-1' of a sugar moiety ($H_1'$ proton). Reaction time required for completion tends to be characteristic of the individual types of purine and pyrimidine moieties involved, the pH of the reaction and the temperature; for example, time of equilibration of the hydrogen at position C-8 of the adenine moiety in exchange with deuterium at 95° C. and pH 12 is a few minutes, and time of equilibration of the C-6 hydrogen of the thymine moiety with deuterium at pH 11 and 95° is greater than 5000 hours. Reaction times for deuterium labelling are also approximately equivalent to those for tritium labelling. Thus, if desired, the time required for reaction of large molecules such as transfer RNA, messenger RNA, or DNA, or the time required for labelling by tritium, can be estimated from the reaction times found for deuterium labelling of small molecules such as nucleosides.

Upon attainment of the desired extent of labelling, for example, upon the reaching of exchange equilibrium, the above first reaction step is terminated by cooling to room temperature and, if desired, adjustment to pH 6 to 7. The labelled product compound of the first reaction is now treated with water or other proton-donating solvent to replace easily-replaceable deuterium atoms with hydrogen atoms, For example, the reaction mixture from the first step can be freeze-dried, the residue dissolved in ordinary water and freeze-dried again. Such treatment can be repeated, and if desired, the course of replacement can be followed by NMR analysis. As another example, the reaction product from the first reaction can be precipitated, for example, as barium or a lead salt, suitably redissolved in ordinary water, and these operations repeated. As other solvents in this second step lower alcohols such as methanol, ethanol and 2-propanol, acetic acid, with water if desired, or other proton-donating solvents may be used. The final specifically labelled end product may be used in its solution, or may be isolated by a procedure appropriate for the product compound, such as by ion exchange methods, gel chromatography, electrophoresis, centrifugation, gradient centrifugation, precipitation, dialysis, or other methods well known in the art.

When the first step in the above process is conducted at pH 1 to 8, pyrimidine moieties in the final product are labelled with deuterium at position C-5 and purine moieties are lebelled at position C-8. When the first step is conducted at pH 8 to 12, pyrimidine moieties are labelled at positions C-5 and/or C-6 in individual molecules, but admixed with each other, and purine moieties are lebelled at position C-8. To obtain a final product with pyrimidine moieties labelled with deuterium only at position C-6 and purine moieties unlabelled, the first reaction is conducted at pH 8 to 12 as given above. The reaction mixture is cooled and freeze-dried or evaporated, and the residue is taken up in water and adjusted to below pH 8, preferably pH 2 to 5. The reaction mixture is again heated to the elevated temperature and held there for the same length of time as before, to bring about replacement of deuterium atoms at position C-5 of pyrimidine moieties and position C-8 of purine moieties by hydrogen atoms. Thereupon the reaction mixture is cooled and the product is isolated, as given above, to yield an end product with pyrimidine moieties labelled at position C-6 and purine moieties unlabelled.

In the preferred embodiment of the process of the present invention, tritium-labelled purine- and pyrimidine-containing compounds are prepared essentially as given for deuterium labelling above, except that tritium oxide solution is substituted for deuterium oxide. Usually the concentration of tritium oxide is much lower than that used for deuterium labelling, being about 1 to 100 curies per gram. The course of labelling in the first step can be followed by use of paper chromatography or thin layer chromatography, with determination of radioactivity of the product compound, for example, by use of a paper chromatogram strip counter. The time required to attain the desired extent of labelling can be estimated from a pilot trial with deuterium oxide or from knowledge of the labelling of small molecules, as described above. In tritium labelling, the operation of the two labelling steps and the isolation of the product should be done under the precautions given in standard texts on the handling of radioactive materials, for example, E. A. Evans, "Tritium and Its Compounds," Van Nostrand (1966).

The following examples illustrate the process of the present invention but are not to be construed as limiting.

EXAMPLE 1

Cytidine-5-D

A solution is prepared containing 243 ml. (1 mmole) of cytidine and 0.5 ml. of 99.8% deuterium oxide, 154 mg. (2 mmole) of ammonium acetate, 122 mg. (2 mmole) of acetic acid-$D_1$ and sufficient deuterium oxide to bring the solution up to 1 ml. This solution is heated in a sealed tube at 95±1° C. for a period of 19 hours. The reaction mixture is then cooled, diluted with 5 ml. of water and taken to dryness under reduced pressure. The resulting residue is dissolved in 1.4 ml. of water and 0.6 ml. of methanol. The solution is thereupon absorbed onto an ion exchange column charged with Dowex 1×2 (OH=cycle, 200–400 mesh), made up according to Dekker, J. Am. Chem. Soc. 87: 4027 (1965). [Dowex 1×2 ion exchange resin is a polystyrene trimethyl benzyl ammonium cation exchange resin, 2% cross-linked, prepared by methods described in Kunin, Ion Exchange Resins, 2nd ed. (1958), John Wiley and Sons, Inc.] The column in eluted with 3 liters of a mixture of 30% methanol-water taking 20-ml. fractions and monitored in the ultraviolet at 270 millimicrons by means of a Vanguard 1056 O.D. ultraviolet monitor. Fractions 27 to 33 contain pure cytidine and cytidine-5-D with λmax. 271 millimicrons in water. These fractions, 27–33, were pooled and evaporated to give cytidine labeled in position 5 which by nuclear magnetic resonance analysis showed 80% labeled cytidine (deuterium on carbon atom 5) and 20% unlabeled cytidine. The product is crystallized from 95% ethanol to give a white solid, M.P. 209–211° (uncorrected).

EXAMPLE 2

Cytidine-5,6-$D_2$

Asolution of 243 mg. (1 mmole) of cytidine in 1 ml. of 99.8% deuterium oxide was adjusted to a pH of 12 by the addition of 40% NaOD in $D_2O$. The solution was heated in a sealed tube at 95±1°C. and the exchange of H-5, H-6 protons with deuterons was followed by nuclear magnetic resonance analysis as in Example 1. After 18 hours an exchange equilibrium was reached. The reaction mixture was now cooled to room temperature, adjusted to a pH of 5 with glacial acetic acid and diluted with 5 ml. of water. Nuclear magnetic resonance analysis indicated that the cytidine component of the solution consisted of 55% cytidine, 5,6-$D_2$, 25% cytidine-5-D, 10% cytidine-6-D and 10% unlabeled cytidine. The labeled cytidine mixture was isolated and evaporated to dryness and crystallized as in Example 1.

EXAMPLE 3

Deuterium substituted uridine

In the manner given in Example 2, uridine in heavy water at a pH of 12.3 (terminal pH of 11.2), produced by adding NaOD, was heated to 95° C. to give, after 152 minutes, a mixture of the following composition:

19% of uridine-5,6-$D_2$
15% uridine-5-D
15% uridine-6-D
51% uridine (no replacements)

The product, after chromatography, is crystallized from 95% ethanol.

EXAMPLE 4

Uridine-5-D

In the manner given in Example 1, uridine was heated to 95° C. in heavy water for 5 days, at a pH of about 5 to give uridine-5-D and unlabeled uridine.

EXAMPLE 5

Thymidine-6-D

In the manner given in Example 2, a solution of 1-β-D-(2-deoxy)ribofuranosylthymine was heated to 95° C. with NaOD in heavy water for a period of 4200 hours to give a small amount of 6-deuterium substituted thymidine.

EXAMPLE 6

Deuterium-substituted 1-β-D-arabinofuranosylcytosine

In the manner given in Example 2, a solution of 1-β-D-arabinofuranosylcytosine was heated in heavy water in the presence of sufficient NaOD so that the initial pH was about 13. The solution was kept for 6.6 hours at 95° C., cooled and evaporated to give a mixture containing 1-β-D-arabinofuranosylcytosine substituted in the 5-position to an extent of about 45%, substituted in the 6-position to an extent of about 10%, and 5,6-deuterium-substituted cytosinearabinoside to an extent of about 40% and about 45% starting material.

EXAMPLE 8

Adenosine-8-D

A 265 mg. (1 mmole) sample of adenosine was suspended in 1 ml. of 99.8% deuterium oxide and the pH of the suspension was adjusted to 12.4 with 40% NaOD in heavy water. The resulting solution was heated in a sealed tube to 95±1° C. for a period of 27 minutes. The solution was then cooled, adjusted to a pH of 5 with glacial acetic acid and diluted with 5 ml. of water. Nuclear magnetic resonance analysis indicated that the adenosine component of the mixture consisted of 94% adenosine-8-D and 6% unlabeled adenosine. The solution was evaporated to dryness and the labeled product separated by chromatography of the reaction mixture over Dowex 1×2 resin and isolated by evaporation.

EXAMPLE 9

Adenosine-8-D triphosphate 50 mg. of adenosine triphosphate as sodium salt is dissolved in 99.8% deuterium oxide and the solution is adjusted to a pH of 7. The solution was then heated to between 70 to 95° C. in a sealed tube. After the desired extent of labeling took place, as determined by nuclear magnetic resonance analysis, the solution is cooled, treated with water and the labeled product is isolated by evaporation and by high voltage electrophoresis at pH 7 to give labeled adenosine-8-D triphosphate.

EXAMPLE 10

Purine-8-D and pyrimidine-5-D labeled transfer ribonucleic acid

A solution is prepared of 35 mg. of transfer-ribonucleic acid in 1 ml. of 99.8% heavy water at a pH of 7. This solution is heated to 70 to 95° in a sealed tube for 19 hours. The solution is then cooled to room temperature and the labeled product isolated by use of continuous flow electrophoresis.

EXAMPLE 11

Deuterium-substituted 2-thiouridine

In the manner given in Example 3, 2-thiouridine in heavy water at a pH of 12 produced by adding NaOD was heated to 95° C. in a sealed tube for a period of about 3 hours, cooled to room temperature, treated with water, evaporated and chromatographed on Dowex 1X2 (as in Example 1) to give a mixture of 2-thiouridine-5,6-$D_2$; -5D, and -6D.

EXAMPLE 12

Deuterium-substituted (1-β - D - arabinofuranosylcytosine (5-D)-5′-yl) (9-β-D-ribofuranosyladenin (8-D)-5′-yl) phosphate $[pA^{(8D)}Ca^{(5D)}]$; $[pA^{(8D)}Ca^{(5,8D)}]$; $[pA^{(8D)}Ca^{(6D)}]$ and $[pA^{(8D)}Ca]$ A solution of (1-β-D-arabinofuranosylcytosin-5′-yl) (9-β-D-ribofuranosyladenin-5′-yl)phosphate in deuterium oxide and NaOD (pH of 12.4) was heated for 6.6 hours to give a labeled mixture of pACa as follows:

pA(8D)Ca(5,6D) 40% pA(8D)Ca(5D) 45% pA(8D)Ca(6D) 10-15% pA(8D)Ca 5%

EXAMPLE 13

Deuterium substituted uridin-5'-yl, 9-β-D-ribofuranosyl-guanin-5'-yl phosphate

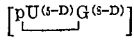

A solution of uridin-5'-yl, 9-β-D-ribofuranosyl guanin-5'-yl phosphate in deuterium oxide, additionally containing ND₄OAc and DOAc so that the pH is 5, is heated at 95° for 175 hours; the product was treated with aqueous methanol then passed through an ion exchange chromatographic column charged with Dowex 1X2 (formate) eluted with a gradient of formic acid in water, the resulting solution was evaporated to give labeled uridin-5₂-yl 9-β-D-ribofuranosylguanin-5'-yl phosphate

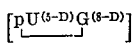

EXAMPLE 14

Deuterium-labeled coenzyme

A coenzyme, containing adenine, thymine, cytosine, uracil, guanine, xanthine, hypoxanthine or the like, in a deuterium oxide solution, buffered to a pH of about 6–6.5 is heated to 75–80° C. for a period of 250 hours. The mixture is then cooled, treated with water-ethanol 2:1 (by volume) evaporated and purified by high voltage electrophoresis to give the deuterium-labeled coenzyme.

EXAMPLE 15

Cytidine-5-T

In the manner give in Example 1, 243 mg. (1 mmole) of cytidine was dissolved in ml. of tritium oxide in water (10 curie/g.) containing sufficient ammonium acetate and HOAc to produce a pH of about 5.5 to 6. The mixture was heated in a sealed tube at 95±1° C. for 18 hours, cooled, diluted with 5 ml. of water and the product cytidine-5-T (200–400 ml./mmole) isolated according to the methods given in Example 1 or E. A. Evans, Tritium and its Compounds, Van Nostrand (1966).

EXAMPLE 16

Cytidine-5,6-T₂; -5-T; -6-T

In the manner given in Example 2, 243 mg. (1 mmole) of cytidine was dissolved in 1 ml. of tritium oxide in water (10 curie/ml.) containing sufficient 40% NaOD to produce a pH of about 12. The mixture was heated in a sealed tube at 95±1° C. for 8 hours. The reaction mixture was then cooled, diluted with 5 ml. of water and the mixture containing cytidine-5,6-T₂, cytidine-6-T, cytidine-5-T, and unlabeled cytidine isolated according to the methods given in Example 2 or E. A. Evans, Tritium and its Compounds, Van Nostrand (1966).

EXAMPLE 17

Tritium-substituted uridin-5'-yl, 9-β-D-ribofuranosyl-guanin-5'-yl phosphate

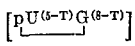

A solution of uridin-5'-yl, 9-β-D-ribofuranosylguanin-5'-yl phosphate in tritium oxide (100 curie/ml.) in water, additionally containing ammonium acetate and acetic acid so that the pH is about 5, is heated at 95° C. for 200 hours. The product was then treated with water and isolated by paper chromatography with a solvent system consisting of isobutyric acid 10 parts and 5 N ammonium hydroxide 6 parts, to give tritium labeled uridine-5'-yl, 9-β-D-ribofuranosylguanin-5'-yl phosphate

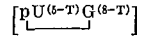

EXAMPLE 18

Tritium-labeled coenzyme

A coenzyme, containing adenine, thymine, cytosine, uracil, guanine, xanthine, hypoxanthine or the like, in a tritium oxide solution, buffered to a pH of about 6–6.5 is heated to 75–80° C. for a period of 250 hours. The mixture is then cooled, treated with water-methanol (2:1 by volume) evaporated and isolated by high voltage electrophoresis tritium labeled coenzyme.

EXAMPLE 19

Tritium-labeled (1-β-D-arabinofuranosylcytosin-3'-yl) (9-β-D-ribofuranosylxanthine-5'-yl) phosphate In the manner given in Example 12, a solution of (1-β-D-arabinofuranosylcytosin-3'-yl) (9-β-D-ribofuranosylxanthin-5'-yl) phosphate in (100 curie/ml.) tritium oxide and with NaOH present so that the solution had a pH of 12, was heated for 10 hours at 95±1° C. The labeled mixture was separated and purified by high voltage electrophoresis. The resulting product mixture contained

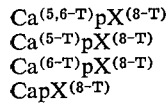

and unlabeled CapX starting material.

EXAMPLE 20

Purine-8-T and pyrimidine-5-T labeled transfer ribonucleic acids

Likewise as in Example 10, t-RNA is heated for 24 hours in tritium oxide at pH about 5. The solution is cooled to room temperature and the tritium labeled transfer ribonucleic acid is isolated by paper chromatography on Whatman 3MM employing the solvent system given in Example 17, to give purine-8-T and pyrimidine-5-T labeled transfer ribonucleic acids.

This reaction can be performed at a pH between 5 to 8.

EXAMPLE 21

Cytidine-6-D

A solution of 243 mg. of cytidine in 1 ml. of 99.8% deuterium oxide is adjusted to pH 12 by addition of NaOR in deuterium oxide. The solution is heated in a sealed tube at 98° C. for 18 hours. The solution is evaporated and the solids taken up in 5 ml. of solution containing 154 mg. of ammonium acetate and 122 mg. of acetic acid in ordinary water. The reaction mixture is heated in a sealed tube at 95° for 18 hours, cooled, and the desired product, cytidine-6-D, is isolated by ion exchange chromatography as in Example 1.

EXAMPLE 22

1-β-D-arabinofuranosylcytosin-(6-T)-5'-yl (9-β-D-ribofuranosylxanthin-5'-yl) phosphate In the manner given in Example 12, a solution of (1-β-D-arabinofuranosylcytosin-5-yl) 9-β-D-ribofuranosylxanthine in tritium oxide and with NaOH present so that the solution had a pH 12, was heated for 10 hours at 95±1° C. The labeled mixture was freeze-dried and the residue taken up in 5 ml. of water adjusted to pH 4 with acetate buffer, heated to 95° C. for 10 hours, then cooled, freeze-dried and the product isolated by ion-exchange chromatography to give the 6-tritium labeled (1-β-D-arabinofuranosylcytosin-5'-yl)9-β-D-ribofuranosylxanthin-5'-yl phosphate.

In the manner given in the before-standing examples other tritium- and deuterium - substituted nucleosides, mononucleotides, oligonucleotides, nucleotides, ribonucleic acids, 2-deoxyribonucleic acids coenzymes and the like are obtained by heating the unlabeled compounds in deuterium or respectively tritium oxide at a selected pH, washing out the lightly bound deuterium or tritium atoms, while leaving the solid bound ones intact, and isolating the labeled product by standard procedures. Other representative compounds which can be prepared by this process are:

5-fluorouridine-6-D and -6-T;
5-chlorouridine-6-D and -6-T;
5-trifluoromethyluridine-6-D and -6-T;
1-β-D-arabinofuranosyl-5-fluorouracil-6-D and -6-T;
1-β-D-lyoxofuranosylcytosine-5-D;
1-β-D-lyxofuranosylcytosine-5,6-$D_2$;
1-β-D-lyxofuranosylcytosine-6-D and -6-T;
1-β-D-xylofuranosylcytosine-6-D and -6-T;
1-β-D-arabinofuranosylcytosin-5'-yl phosphate-5-D;
1-β-D-arabinofuranosylcytosin-5'-yl phosphate-6-D;
1-β-D-arabinofuranosylcytosin-5'-yl phosphate-5,6-$D_2$;
9-β-D-arabinofuranosyladenine-8-D and -8-T;
9-β-D-xylofuranosyladenine-8-D and -8-T;
9-β-D-lyxofuranosyladenine-8-D and -8-T;
9-β-D-(2-deoxy)ribofuranosyladenine-8-D and -8-T;
9-β-D-arabinofuranosylguanin-2'-yl phosphate-8-D;
9-β-D-arabinofuranosyl-6-mercaptopurine-5'-yl phosphate-8-D and -8-T;
9-β-D-ribofuranosylhypoxanthin-3'-yl phosphate-8-D and -8-T;
bis(1-β-D-arabinofuranosylcytosin-5'-yl)phosphate-5-D; -6-D and -5,6-$D_2$;
D and T substituted homopolymeric oligonucleotide phosphates such as $Cap^{(5,D)}$ $Cap^{(5,D)}$ $Cap^{(5,D)}$; $Ap^{(8D)}$ $Ap^{(8D)}$ $Ap^{(8D)}$; $pCa^{(5,6,D)}$ $pCa^{(5,6,D)}$ $pCa^{(5,6,D)}$; $Ap^{(8T)}$ $Ap^{(8T)}$ $Ap^{(8T)}$;
mixed oligonucleotides, such as $T^p$ Ca; $Ca^{(5T)}$ $pUa^{(5T)}$; $pC^{(5,6,D)}$ $U^{(5,6,D)}$; $Ua^{(5D,6D)p}$ $A^{(8D)}$; and the like.

I claim:

1. An improved process for labelling with deuterium or tritium pyrimidine and purine moieties, in which the improvement comprises: heating at 75 to 100° C. a compound containing pyrimidine or purine moieties in deuterium oxide or tritium oxide, without a metallic catalyst, at a selected pH between 1 and 12; and eliminating by treating with water or a proton-donating solvent easily exchangeable deuterium and tritium atoms to obtain the corresponding pyrimidine and purine containing compounds labelled in specific predeterminable positions.

2. A process according to claim 1 for obtaining pyrimidine containing compounds in which the pyrimidine is labelled in position 5 with deuterium or tritium, which comprises: heating a compound containing a pyrimidine moiety in deuterium or tritium oxide to a temperature between 70 to 100° C. at a pH between 1 and 8; and treating the obtained products with water or a proton-donating solvent to remove easily exchangeable deuterium or tritium atoms to obtain the corresponding labelled compound.

3. A process according to claim 2 for obtaining 1-β-D-arabinofuranosylcytosine, labelled in position 5 with deuterium or tritium, which comprises: heating 1 - β - D-arabinofuranosylcytosine in deuterium or tritium oxide to a temperature between 70 to 100° C. at a pH between 1–8; and treating the obtained products with water or a proton-donating solvent to remove easily replaceable deuterium or tritium atoms to obtain the corresponding compound in which the cytosine moiety is labelled in position 5.

4. A process according to claim 2 for obtaining cytidine, labelled in position 5 with deuterium or tritium, which comprises: heating cytidine in deuterium or tritium oxide to a temperature between 70 to 100° C. at a pH between 1–8; and treating the obtained products with water or a protondonating solvent to remove easily replaceable deuterium or tritium atoms to obtain the corresponding cytidine in which the cytosine moiety is labelled in position 5.

5. A process according to claim 1 for obtaining pyrimidine containing compounds in which the pyrimidine is labelled in position 5 and/or 6 with deuterium or tritium which comprises: heating a compound containing a pyrimidine moiety in deuterium or tritium oxide to a temperature between 70 to 100° C. at a pH between 8 and 12; and treating the obtained products with water or a proton-donating solvent to remove easily replaceable deuterium or tritium atoms to obtain the corresponding compound in which the pyrimidine moiety is labelled in positions 5 and/or 6.

6. A process according to claim 1 for obtaining purine containing compounds in which the purine is labelled in position 8 with deuterium or tritium, which comprises: heating a compound containing a purine moiety in deuterium or tritium oxide to a temperature between 70 to 100° C., at a pH between 1 to 12; and treating the obtained products with water or a proton-donating solvent to remove easily replaceable deuterium or tritium atoms to obtain the corresponding compound in which the purine moiety is labelled in position 8.

7. A process according to claim 1 for labelling nucleic acids, which comprises: heating at 75–100° C. a nucleic acid with deuterium or tritium oxide at a pH between 5 to 8 and eliminating by treating with water or a protondonating solvent easily replaceable deuterium or tritium atoms to obtain the corresponding nucleic acid in which the pyrimidine moieties are labelled in position 5 and the purine moieties are labelled in position 8.

8. A process for the exclusive labelling of pyrimidine moieties in position 6 with deuterium or tritium, which comprises: reacting a starting material containing pyrimidine moieties with deuterium oxide or tritium oxide at pH 8 to 12 at 75 to 100° C.; removing the solvent; and treating the reaction product with water at pH 1 to 8 at 75 to 100° C.; and isolating the 6-labelled product.

References Cited

UNITED STATES PATENTS 3,325,420   6/1967   Futterknecht et al. _ 252—301.1

OTHER REFERENCES

"Chem. Abst.," vol. 66, 1967, pp. 55,725(h) and 72,757(n).

LEWIS GOTTS, Primary Examiner

J. R. BROWN, Assistant Examiner

U.S. Cl. X.R.

260—211.7, 251, 252, 999

UNITED STATES PATENT OFFICE
CERTIFICATE OF CORRECTION

Patent No. 3,520,872   Dated July 21, 1970

Inventor(s) William J. Wechter

It is certified that error appears in the above-identified patent and that said Letters Patent are hereby corrected as shown below:

Column 1, line 61, should appear as shown below instead of as in the patent:

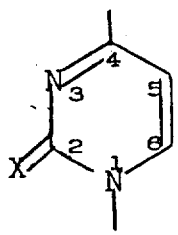

Column 1, line 43, for "position" read -- positions --. Column 3, line 15, for "miles" read -- moles --. Column 5, line 4, for "OH=" read -- OH- --; line 10, for "in eluted" read -- is eluted --. Column 7, line 23, for "uridin-5$_2$-" read -- uridin-5'- --; line 40, for "give in" read -- given in --; line 41, for "in ml." read -- in 1 ml. --; line 56, for " 8 hours" read -- 18 hours --. Column 8, line 51, for "NaOR" read -- NaOD --; lines 71-73, for "(1-β-D-arabinofuranoxylcytosin-4'-yl)9-β-D-ribofuranosylxanthin-5'-yl phosphate." read -- 1-β-D-arabinofuranosylcytosin-5'-yl (9-β-D-ribofuranosylxanthin-5'-yl phosphate. -- Column 9, line 35, for "pCa(5,5,D)" read -- pcA(5,6,D) --.

Signed and sealed this 12th day of October 1971.

(SEAL)
Attest:

EDWARD M. FLETCHER, JR.
Attesting Officer

ROBERT GOTTSCHALK
Acting Commissioner of Patents